United States Patent
Loveland

(10) Patent No.: US 8,894,082 B2
(45) Date of Patent: Nov. 25, 2014

(54) PEDAL POWERED WHEELED VEHICLE

(75) Inventor: Andrew Loveland, Oxfordshire (GB)

(73) Assignee: Early Rider Limited, Oxford (GB)

( * ) Notice: Subject to any disclaimer, the term of this patent is extended or adjusted under 35 U.S.C. 154(b) by 279 days.

(21) Appl. No.: 13/055,337

(22) PCT Filed: Jul. 23, 2009

(86) PCT No.: PCT/GB2009/001833
§ 371 (c)(1),
(2), (4) Date: Jul. 20, 2011

(87) PCT Pub. No.: WO2010/010357
PCT Pub. Date: Jan. 28, 2010

(65) Prior Publication Data
US 2011/0266769 A1      Nov. 3, 2011

(30) Foreign Application Priority Data

Jul. 23, 2008 (GB) .................................. 0813488.4

(51) Int. Cl.
*B62M 3/08* (2006.01)
*B62K 19/34* (2006.01)
*B62M 3/00* (2006.01)
*B62K 15/00* (2006.01)

(52) U.S. Cl.
CPC ............ *B62M 3/08* (2013.01); *B62K 2015/003* (2013.01); *B62K 19/34* (2013.01); *B62M 3/003* (2013.01)
USPC .............................. 280/259; 74/560; 74/594.7

(58) Field of Classification Search
CPC .......... B62M 3/003; B62M 3/02; B62M 3/08; B62K 15/006; B62K 15/008; B62K 2015/003
USPC ........... 74/560, 594.1, 594.4, 594.7; 280/259, 280/639
See application file for complete search history.

(56) References Cited

U.S. PATENT DOCUMENTS

| 2,470,414 | A | * | 5/1949 | Rippenbein | 74/594.4 |
| 2,536,466 | A | * | 1/1951 | Rippenbein | 74/594.7 |
| 4,132,428 | A | * | 1/1979 | Lassiere | 280/278 |
| 4,448,435 | A | * | 5/1984 | Hon | 280/278 |
| 4,842,292 | A | * | 6/1989 | Wang | 280/287 |
| 5,069,468 | A | * | 12/1991 | Tsai et al. | 280/278 |
| 5,273,300 | A | * | 12/1993 | Wells | 280/259 |
| 5,326,118 | A | * | 7/1994 | DeRosa | 280/205 |

(Continued)

FOREIGN PATENT DOCUMENTS

| DE | 200 09 914 U1 | 2/2001 |
| FR | 2882336 A | 8/2006 |
| JP | 2005081859 A | 3/2005 |

*Primary Examiner* — Anne Marie Boehler
*Assistant Examiner* — Maurice Williams
(74) *Attorney, Agent, or Firm* — McDonnell Boehnen Hulbert & Berghoff LLP

(57) ABSTRACT

A bicycle having rotatable drive member in the form of a hollow drum (22) with pedals (48, 49). Each pedal is mounted in a foldable manner to a crank arm (24, 25) which in turn is mounted to the drum (22) by a pivoting mechanism (26, 27) allowing the pedals to be moved between an operative configuration in which each pedal projects outwardly from the drum (22), and an inoperative configuration in which each pedal (48, 49) and each crank arm (24, 25) is contained within the interior of the drum (22). The bicycle can thus be used as a training aid without the use of pedals, or in a conventional manner.

19 Claims, 7 Drawing Sheets

(56) References Cited

U.S. PATENT DOCUMENTS

| | | | |
|---|---|---|---|
| 6,425,598 B2 * | 7/2002 | Murayama | 280/278 |
| 7,140,629 B2 * | 11/2006 | Chen | 280/287 |
| 7,306,249 B2 * | 12/2007 | Kwok et al. | 280/278 |
| 7,891,271 B2 * | 2/2011 | Grant | 74/594.7 |
| 2003/0033902 A1 * | 2/2003 | Lee | 74/594.7 |
| 2003/0041689 A1 * | 3/2003 | Chu | 74/594.7 |
| 2007/0209474 A1 * | 9/2007 | Lin | 74/594.7 |
| 2010/0201098 A1 * | 8/2010 | Fitzsimons | 280/287 |

* cited by examiner

PEDAL POWERED WHEELED VEHICLE

CROSS-REFERENCE TO RELATED APPLICATIONS

The present application is a national stage application of International Patent Application No. PCT/GB2009/001833, filed Jul. 23, 2009, which claims priority to Great Britain Application No. 0813488.4 filed Jul. 23, 2008, the contents of which are incorporated by reference herein in their entirety.

The present invention relates to a pedal powered wheeled vehicle. The invention is particularly applicable to a vehicle having a frame supported by wheels that can be driven by means of pedals, which rotate crank arms connected to an axle which is in turn connected to drive one or more wheels. The invention is particularly, but not exclusively, applicable to bicycles.

The drive train of a conventional bicycle converts the reciprocating motion of the rider's legs into rotational motion used to drive the rear wheel. Most bicycles use a chain to transmit power to the rear wheel, although a relatively small number of bicycles use a shaft drive to transmit power, and a smaller number use a belt drive as an oil-free way of transmitting power.

Typically, pedals are attached to crank arms which are connected to either end of a spindle which extends transversely of the bicycle frame and is mounted in bearings within the bottom bracket of the frame. In the case of a chain driven bicycle, one or more chain rings or chain wheels is connected for rotation with the spindle to drive a chain which in turn rotates a sprocket attached to the rear wheel.

On a conventional bicycle, the crank arms and pedals are securely fixed to the axle and both tools and time are required to remove them, for example for transportation of the bicycle as a package by air. In the case of some folding bicycles, the pedals can be folded with respect to the crank arms to reduce the space taken up when the bicycle is folded and the pedals are not required for propulsion.

U.S. Pat. No. 2007/0007745 appears to point towards a pedal powered vehicle having a frame, a rotatable member mounted on the frame by means of a bearing for rotation with respect to the frame about a transverse axis of rotation; a first crank assembly connected to one end of the rotatable member and comprising a first crank arm joined at one end to said one end of the rotatable member and at the other end to a first pedal; and a second crank assembly connected to the other end of the rotatable member and comprising a second crank arm joined at one end to said other end of the rotatable member and at the other end to a second pedal; wherein the rotatable member has a hollow interior which is open at both axial ends. In this document, the vehicle is a training tricycle.

In accordance with the present invention, starting from such an arrangement a pedal powered vehicle has the further feature that each crank assembly is arranged to be manipulated between an operative configuration for driving the rotatable member in rotation by pedalling, and an inoperative configuration in which the crank assembly is at least partially contained within the interior of the rotatable member.

Preferably, each crank arm is connected to the rotatable member for pivoting about a first pivot axis which is perpendicular to the transverse axis of the rotation. Preferably, each pedal is connected to its associated crank arm for pivoting about a second pivot axis which is parallel to the first pivot axis. In a preferred embodiment utilising such arrangements, the pedal can be folded from its operative configuration in which it projects generally perpendicularly from the crank arm, to its inoperative configuration in which it extends generally parallel to the crank arm; and either simultaneously or subsequently, the crank arm can be folded from its operative condition in which it projects radially outwardly from the rotatable member, to its inoperative condition in which it projects generally radially inwardly inside the rotatable member.

Means are preferably provided for locking the crank arms in the operative condition. For example, there may be a crank locking arm whish is also pivotally mounted to the rotatable member, at a position displaced from the pivotal mounting of the crank arm, and engages with a locking recess adjacent the other end of the crank arm when in the operative condition.

The rotatable member is preferably in the form of an open ended drum. Bearings may be provided around the outer surface of the drum, to mount it for rotation in a suitable cylindrical bracket portion attached to the frame.

One use of the invention is for a vehicle which can be used with the pedals inoperative and at least partially stowed within the rotatable member so that a young child can propel the vehicle by means of the child's feet engaging the ground. When the child is sufficiently confident the pedals and crank arms can be unfolded for use. Whilst the invention can be used in such a context with a vehicle having three wheels such as a tricycle, or four or more wheels, the invention is particularly applicable to a bicycle.

Such a vehicle can be used by a child as a learner bicycle or tricycle without pedals, with the pedals and crank arms safely out of the way. The crank arms and pedals can be moved to their operative condition once the child is ready to start pedalling. It is unnecessary to purchase a training cycle without pedals, and then a conventional cycle with pedals. In addition, the child will already be acquainted with the cycle, and feel comfortable with other aspects of the cycle when starting to pedal, as opposed to being faced by a completely different machine. If the child is not confident with pedalling initially, or sufficiently competent, the cranks and pedals can be folded away again until the child is more confident. If a cycle is shared, for example at a nursery or playschool, the cycle can be sued by children of different abilities.

Once a child is sufficiently competent and confident to pedal the cycle, the cranks and pedals can still be moved to the stowed position allowing a child to propel the cycle by means of their feet at times when they do not have the energy to drive the cycle using the pedal drive train, for example when riding up hill or if they have already covered a relatively long distance on their cycle Once a child has grown more and is ready to graduate to a bigger cycle, the pedals and cranks can be folded away again and the cycle handed to another child who needs a learner cycle.

Such a training cycle may also be of use by older people, for example if they have a disability or are being rehabilitated following illness or injury.

Another advantage of the invention is that, when applied to a bicycle particularly, with the pedals and crank arms in the stowed position the bicycle becomes more convenient to store or transport, for example when carried by hand or on a vehicle bike rack.

Although the invention is particularly suitable for learner bicycles for children, it could also be if use in folding bicycles for riders of any age. The rotatable member provides easy and safe storage for the cranks and pedals. In a number of folding bicycles, the pedals can be folded with respect to the cranks, but the cranks still protrude from the spindle through the bottom bracket and can obstruct the folding operation. In a number of designs, the crank arms have to be rotated into a position where folding can be completed. By means of the invention, a more compact folded bicycle can be provided, and/or the folding operation made simpler.

Whilst the description below relates to a bicycle, it will be appreciated that features described herein in relation to a bicycle can, where appropriate, be applied to tricycles and other vehicles. When the expression "cycle" is used herein, it encompasses both bicycles and tricycles. In the case of bicycles it also encompasses bicycles with stabilising wheels. These could be attached for initial use to provide a rider with more confidence for riding without the feet touching the ground, and then removed.

An embodiment of the invention will now be described by way of example and with reference to the accompanying drawings, in which.

Figure 1:
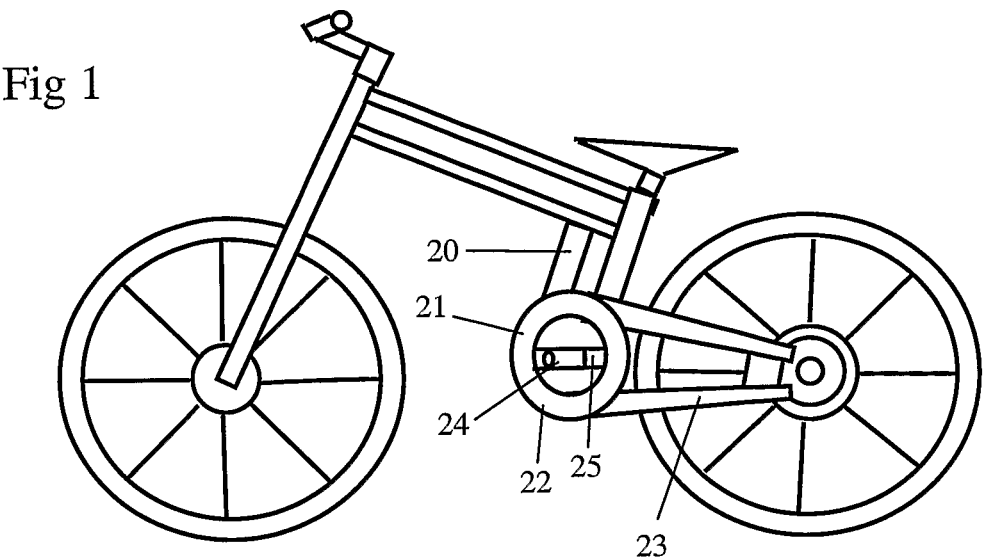
FIG. 1 illustrates an embodiment of a bicycle in accordance with the invention, with the pedals and crank arms in a retracted position.
Figure 1A:
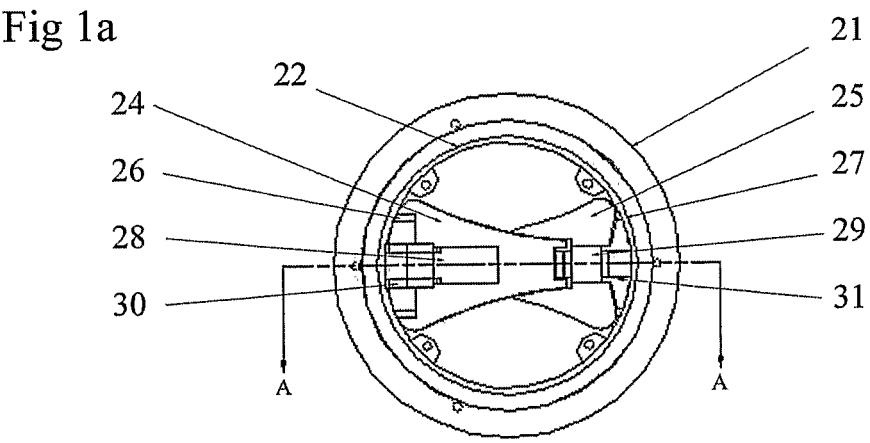
FIG. 1a is an enlargement of the bottom bracket of the bicycle, showing the pedals and crank arms in a retracted position.

Referring first to FIGS. 1 and 1a, there is shown a bicycle frame 20, having a bottom bracket 21 into which a hollow cylindrical axle 22 in the form of a drum is mounted for rotation and restrained axially. Attached to the bottom bracket 21, there is a chainstay 23. Whilst only the outside of the bottom bracket 21 and chainstay 23 are shown, it is to be understood that within bottom bracket 21 there are bearings holding in place the hollow axle 22, and chainring attached to the hollow axle 22, that drives a chain that passes within the chainstay 23 and connects to a sprocket on the rear wheel, also housed within the chainstay 23.

FIG. 1a shows an expanded image of the bottom bracket 21 and components contained therein. Crank arms 24 and 25 are connected to hollow axle 22 by way of hinges 26 and 27. The crank arms 24 and 25 can be pivoted around the hinges 26 and 27 so that they are contained within the hollow axle 22. Crank locking arms 28 and 29 are connected to the hollow axle 22, by way of hinges 30 and 31. The crank locking arms 28 and 29 are also pivoted around their hinges 30 and 31 so as to be contained within hollow axle 22.

Whilst not visible in this view, it is to be understood that crank arms 24 and 25 have pedals attached and that the pedals are also contained within the hollow axle 22. The pedals attach to the crank by the crank arm levers—hinged extensions of the crank arms.

Figure 2:
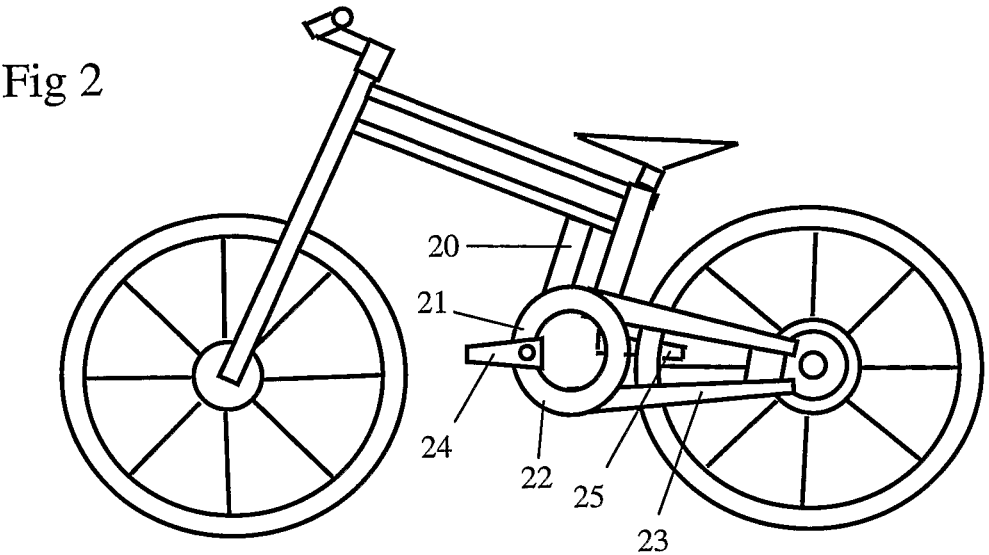
FIG. 2 illustrates the bicycle, with the pedals and crank arms in an operational position.
Figure 2A:
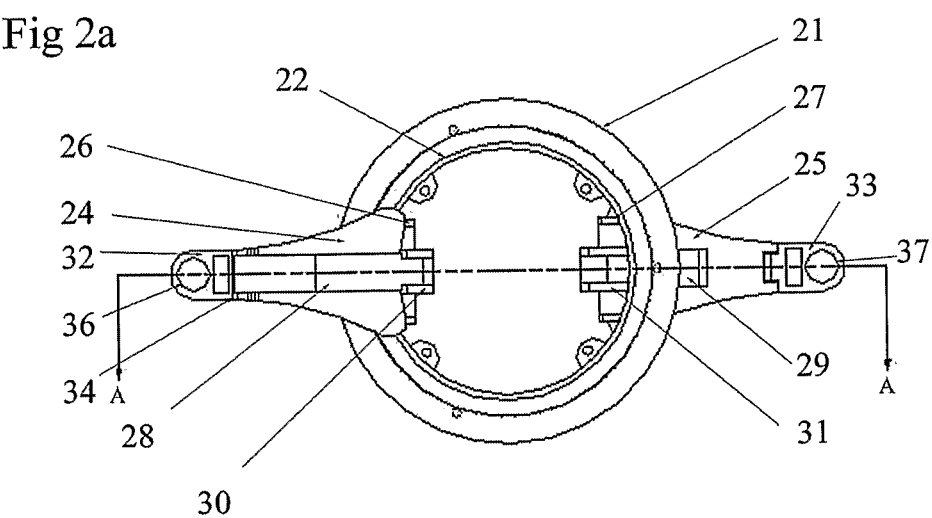
FIG. 2a is an enlargement of the bottom bracket of the bicycle, showing the pedals and crank arms in the operational position.

FIGS. 2 and 2a show the crank arms 24 and 25, rotated around hinges 26 and 27 so as to take position outside of hollow axle 22. Crank locking arms 28 and 29 are also rotated around their corresponding hinges 30 and 31 to as to take positions outside of hollow axle 22. Crank locking arms 28 and 29 engage with crank arm levers 32 and 33 by means of a locking arm recess 34 for crank arm lever 32 and a corresponding locking arm recess 35 for crank arm lever 33 (not visible in this view; see FIG. 4). In locating in locking arm recesses 34 and 35, the crank locking arms 28 and 29 secure the crank arms 24 and 25 in the extended, operational position. Whilst not shown, it is to be understood that the crank locking arms 28 and 29 are to be spring loaded, or are to include and over-centre mechanism so as to prevent them from inadvertently disengaging from the locking arm recesses 34 and 35.

Threaded holes 36 and 37 in crank arm levers 32 and 33 are where the pedal spindles (not shown) connect to the crank lever arms.

Figure 3:
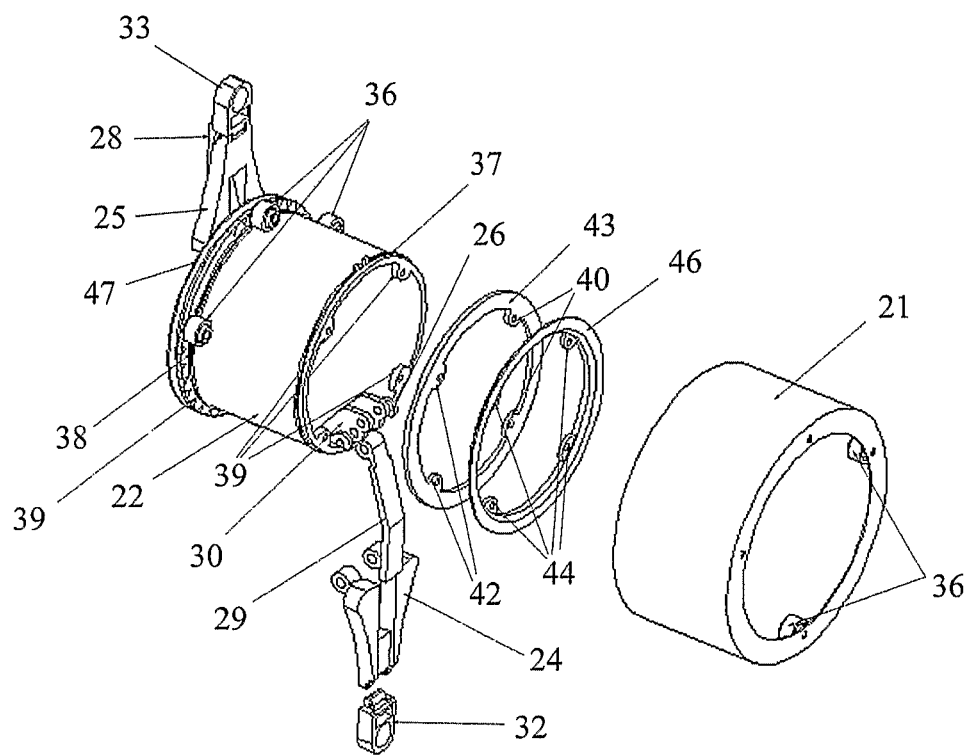
FIG. 3 is an exploded diagram showing the drive components in a preferred embodiment of the invention.

FIG. 3 is an exploded diagram showing the component parts of the pedal drivetrain. Hollow axle 22 is shown seated within bearing 36 mounted on the inside of bottom bracket 21 (shown here detached from the frame) and further held in position by split rings 37 and 38. On the inside of the hollow axle 22, the crank arm hinges 26 and 27 (hidden from view) and crank locking arm hinges 30 and 31 (hidden from view) are mounted as are lugs 39. Corresponding lugs 40 (hidden from view) on the chainring 41, lugs 42 on the spacer 43, and lugs 44 and 45 (hidden from view) on the protective flanges 46 and 47 respectively, allow the chainring 41, spacer 43 and protective flanges 46 and 47 to be bolted to the hollow axle 22.

Figure 4:
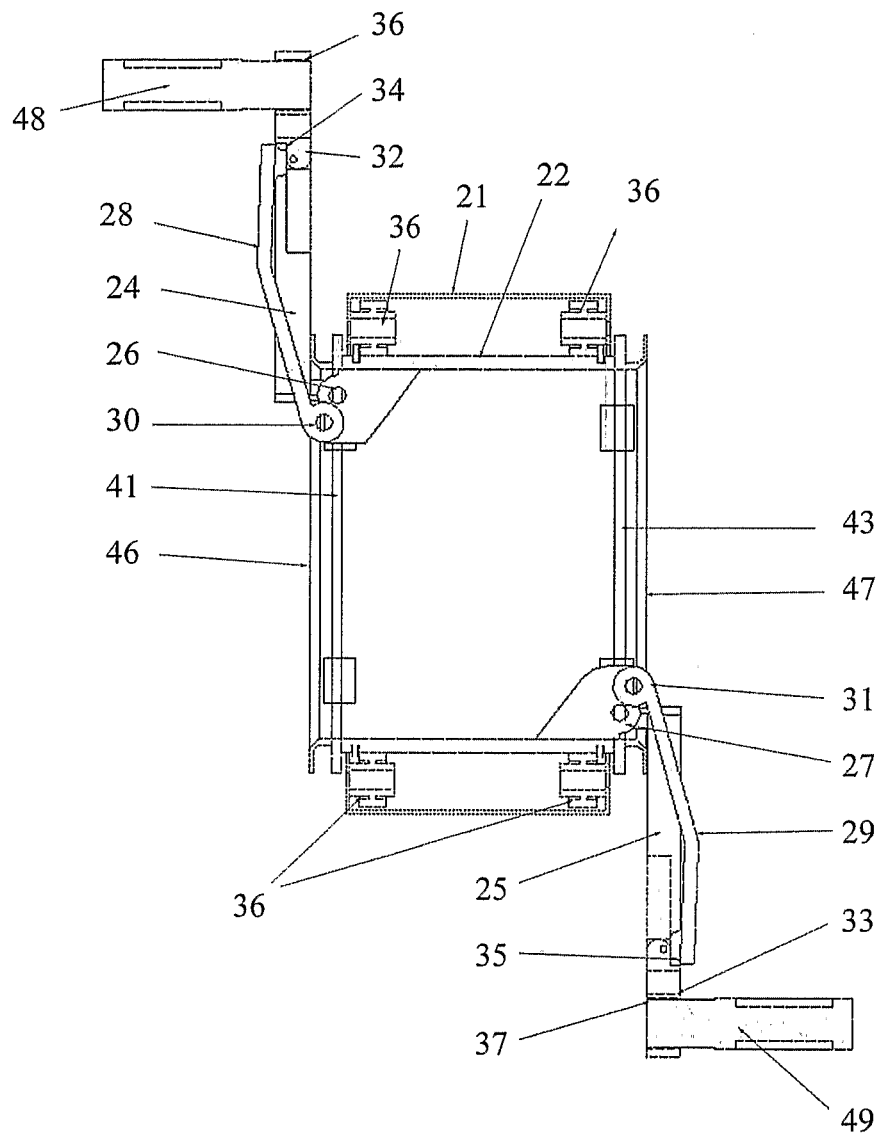
FIG. 4 is a cross section of the drive components, illustrating the pedals and crank arms in the operational position.

FIG. 4 is a cross section of the pedal drivetrain assembly. The pedals 48 and 49 are shown in their operational position, connected to crank arm levers 32 and 33 via threaded holes 36 and 37. The crank arm levers 32 and 33 are secured in the operational position by the location of crank locking arms 28 and 29 into the locking arm recesses 34 and 35. The displacement of the crank locking arm hinges 30 and 31 relative to crank arm hinges 26 and 27 results in the crank locking arms 28 and 29 rotating with a wider radius that conflicts with the tighter radius of the crank arms 24 and 25 and crank arm levers 32 and 33. The result is that the crank arms 24 and 25 and crank arm levers 32 and 33 cannot rotate due to the crank locking arms 28 and 29 needing to follow the path of the wider radius in order to rotate. The crank arms 24 and 25 and crank arm levers 32 and 33 are therefore locked in position until crank locking arms 28 and 29 are removed from locking arm recesses 34 and 35.

FIG. 4 also provides a view of how hollow axle 22 is located in bottom bracket 21 and held in axis by bearings 36. Bearings 36 are shown secured to bottom bracket 21 and retained in position by split rings 37 and 38. Chainring 41, spacer 43 and protective flanges 46 and 47 are shown connected to hollow axle 22.

Figure 5:
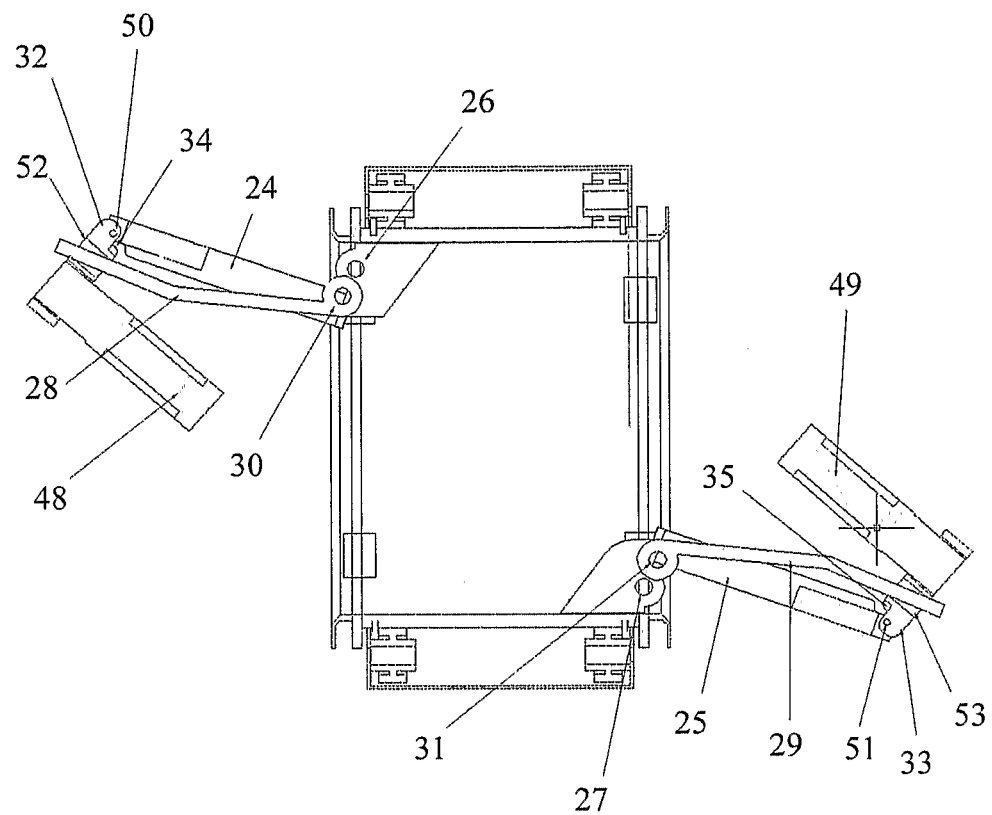
FIG. 5 is a cross section of the drive components, illustrating the pedals and crank arms in a position of transition between retracted and operational conditions.

FIG. 5 is a further cross section of the pedal drivetrain assembly. The pedals 48 and 49 are shown in transition between the operative position and the inoperative position. Crank locking arms 28 and 29 are released from locking arm recesses 34 and 35, by being pulled by hand, allowing crank arm levers 32 and 33 to rotate around crank arm lever hinges 50 and 51, allowing crank arms 24 and 25 to rotate around crank arm hinges 26 and 27, and allowing crank locking arms 28 and 29 to rotate around locking arm hinges 30 and 31. Slots 52 and 53 in crank arm levers 32 and 33 allow crank locking arms 28 and 29 to pass through crank arm levers 32 and 33 so as not to interfere with the pivoting of pedals 48 and 49 into the inoperative position.

Figure 6:
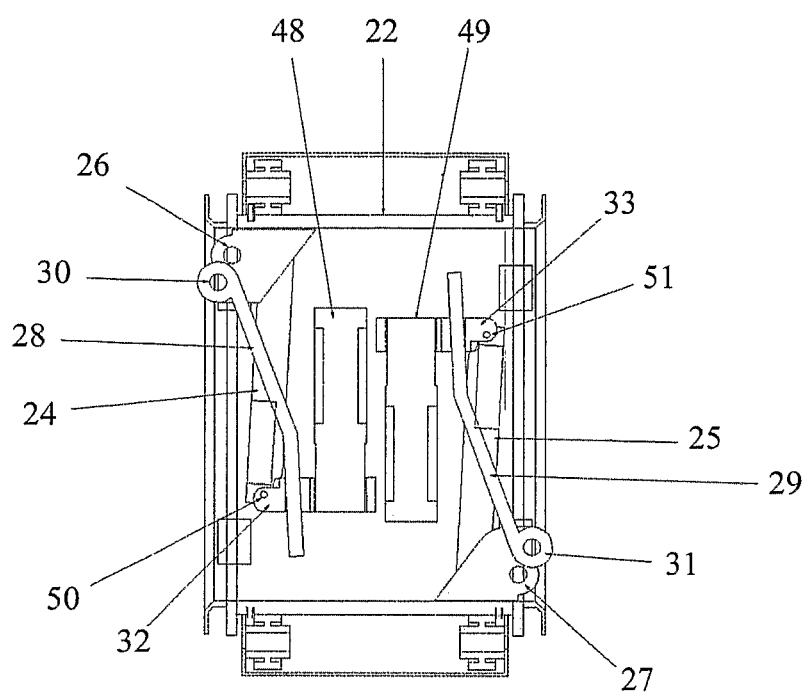
FIG. 6 is a cross section of the drive components, illustrating the pedals and crank arms in the retracted condition.

FIG. 6 is a further cross section of the pedal drivetrain assembly. The pedals 48 and 49 are shown in the inoperative position contained within hollow axle 22. Crank arm levers 32 and 33 have been rotated further in an anticlockwise direction around crank arm lever hinges 50 and 51 so that pedals 48 and 49 reside adjacent to crank arms 24 and 25 and crank locking arms 28 and 29 also contained within hollow axle 22, having also been rotated further in an anticlockwise direction around crank arm hinges 26 and 27 and locking arm levers 30 and 31 respectively. Whilst not shown, it is to be understood that the pedals 48 and 49 are held securely in the inoperative position by way of a simple locking device such as spring loaded crank arm hinges 26 and 27.

Figure 7:
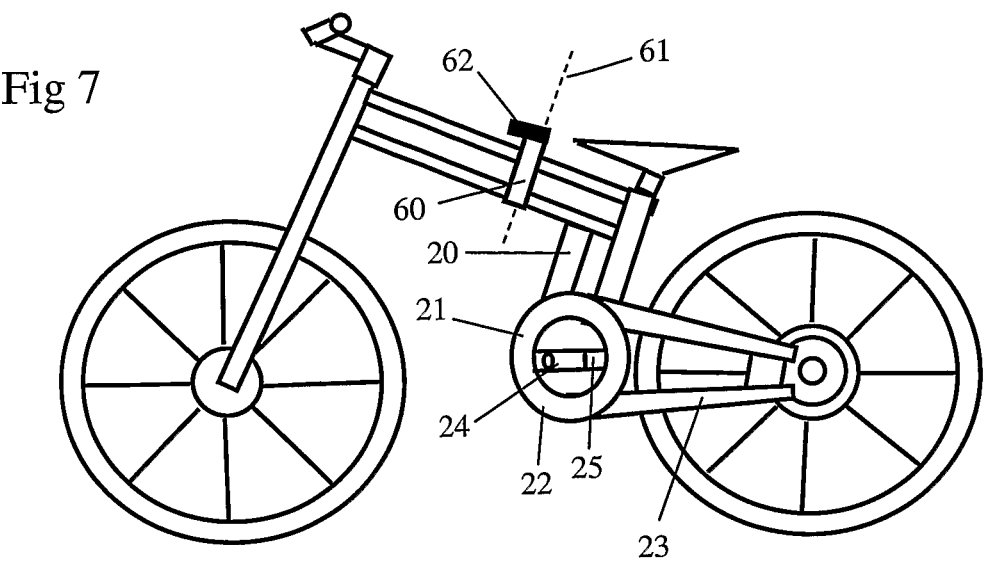
FIG. 7 is a view of a bicycle similar to that of FIG. 1, but adapted for folding.

FIG. 7 shows a modification of the bicycle, in which the frame is provided with a hinge 60 so that the front and rear portions can be folded about axis 61 and lie against each other. A locking lever 62 is provided to lock the frame in the unfolded condition. The pedals and crank arms are folded into the hollow axle 22 before the bicycle is folded. The handlebars may also be folded and the saddle lowered if necessary, as in a conventional folding bike. The bicycle may be provided with gears, such as an epicyclic hub gear for the rear wheel.

In a preferred embodiment of an aspect of the invention, there is provided a bicycle having rotatable drive member in the form of a hollow drum (22) with pedals (48,49). Each pedal is mounted in a foldable manner to a crank arm (24, 25) which in turn is mounted to the drum (22) by a pivoting mechanism (26,27) allowing the pedals to be moved between an operative configuration in which each pedal projects outwardly from the drum (22), and an inoperative configuration in which each pedal (48, 49) and each crank arm (24,25) is contained within the interior of the drum (22). The bicycle can thus be used as a training aid without the use of pedals, or in a conventional manner.

The above embodiments are by way of example only and it will be appreciated that modifications may be made. It will also be appreciated that the invention may be expressed in a number of different ways. For example, viewed from another aspect the invention provides a pedal powered vehicle, such as a cycle, having a pedal driven rotatable drive member in the form of a hollow drum with pedals secured to both ends thereof, wherein the pedals can be moved between an operative configuration for driving the rotatable drive member, and an inoperative configuration in which the pedals are contained within the interior of the rotatable drive member. In accordance with embodiments of this aspect, the pedals may be attached to crank arms which are in turn secured to the rotatable drive member. In such an arrangement, in the inoperative configuration of the pedals, the crank arms may be at least partially contained within the interior of the rotatable drive member. In an alternative arrangement, the pedals may be mounted directly to the rotatable drive member. It will be appreciated that if the diameter of the rotatable drive member is sufficiently large, it may be unnecessary to have crank arms as mounting the pedals towards the circumference of the drive member will produce a sufficient couple.

Viewed from another aspect the invention provides a pedal powered vehicle, such as a cycle, having a pedal driven rotatable drive member in the form of a hollow drum with pedals secured to both ends thereof, wherein the pedals can are mounted to the drive member by a pivoting mechanism allowing the pedals to be moved between an operative configuration in which each pedal projects outwardly from the drive member, and an inoperative configuration in which each pedal is contained within the interior of the rotatable drive member. In accordance with embodiments of this aspect, each pedal may be pivotally attached to a crank arm which in turn is pivotally secured to the rotatable drive member. In such an arrangement, in the inoperative configuration of the pedals, each crank arm may be at least partially contained within the interior of the rotatable drive member. In an alternative arrangement, the pedals may be mounted directly to the rotatable drive member. As noted above, if the diameter of the rotatable drive member is sufficiently large, it may be unnecessary to have crank arms as mounting the pedals towards the circumference of the drive member will produce a sufficient couple.

The terminology used in respect of these alternative aspects of the invention is interchangeable between these aspects and between them and the first aspect of the invention described above. Thus, for example, optional features of the first aspect, including features appearing in subsidiary claims, are also applicable to the alternative aspects and may be expressed in alternative terminology consistent with that of the alternative aspects. The alternative aspects may be expressed in terminology consistent with that of the first aspect. Similarly, the definition of first aspect and its optional features, as set out in the claims, may be expressed in alternative terminology consistent with the alternative aspects.

I claim:

1. A training bicycle for propulsion by a rider by the rider's feet engaging the ground and alternately by the rider using pedals, the bicycle having a frame, a first wheel mounted on a rear of the frame, a second wheel mounted on a front of the frame, handlebars mounted on the frame and connected to steer the second wheel, and a saddle mounted on the frame, wherein a rotatable member is mounted on the frame by means of a bearing, for rotation with respect to the frame about a transverse axis of rotation, the rotatable member being drivingly coupled to the first wheel by means of a chain or belt, a first crank assembly connected to one end of the rotatable member and comprising a first crank arm joined at one end to said one end of the rotatable member and at the other end to an associated first crank arm lever on which is mounted a first pedal; the first crank arm being connected to the rotatable member for pivoting about a first pivot axis; and the first crank arm lever being connected to the first crank arm for pivoting about a second pivot axis; and a second crank assembly connected to the other end of the rotatable member and comprising a second crank arm joined at one end to said other end of the rotatable member and at the other end to an associated second crank arm lever on which is mounted a second pedal; the second crank arm being connected to the rotatable member for pivoting about a third pivot axis; and the second crank arm lever being connected to the second crank arm for pivoting about a fourth pivot axis; the rotatable member having a hollow interior which is open at both axial ends;

wherein each crank assembly is arranged to be manipulated between an operative configuration for driving the rotatable member in rotation by pedalling, and an inoperative configuration in which the crank assembly extends through the respective open end of the hollow interior of the rotatable member and the crank arm and its associated pedal are at least partially contained within the interior of the rotatable member; and wherein:

in the operative condition of each crank assembly, each crank arm projects radially outwardly from the rotatable member, each crank arm lever projects longitudinally from its associated crank arm and each pedal projects generally perpendicularly from the pedal's associated crank arm lever;

and in the inoperative condition of each crank assembly, each crank arm is folded so as to project generally radially inwardly inside the rotatable member and each crank arm lever is folded so that each pedal extends generally parallel to the pedal's associated crank arm.

2. The training bicycle of claim 1, wherein locks are provided for locking the crank arms in the operative condition.

3. The training bicycle of claim 2, wherein, in each crank assembly a crank locking arm is pivotally mounted to the rotatable member, at a position displaced from the pivotal mounting of the crank arm, and engages with a locking recess in the associated crank arm lever when in the operative condition.

4. The training bicycle of claim 1, wherein the rotatable member is in the form of an open ended drum.

5. The training bicycle of claim 4, wherein bearings are provided around the outer surface of the drum, to mount it for rotation in a cylindrical bracket portion attached to the frame.

6. The training bicycle of claim 1, wherein in the inoperative condition the crank arms and pedals are contained wholly within the rotatable member.

7. The training bicycle of claim 1, wherein the rotatable member is connected to a chain wheel which drives a sprocket for the first wheel of the vehicle by means of the belt or chain.

8. The training bicycle of claim 1, which is foldable.

9. The training bicycle of claim 8, wherein in a fully folded condition of the bicycle the crank assemblies are in the inoperative condition.

10. The training bicycle of claim 1, wherein each pedal is held securely in the inoperative position by way of a locking device.

11. A folding bicycle having a folding frame, a first wheel mounted on a rear of the frame, a second wheel mounted on a front of the frame, handlebars mounted on the frame and connected to steer the second wheel, and a saddle mounted on the frame, wherein a rotatable hollow drum with open ends is mounted on the frame by bearings for rotation with respect to the frame about a transverse axis of rotation and being drivingly coupled to the first wheel by means of a chain or belt, a first crank arm having one end connected to one end of the drum, and the other end connected to an associated first crank arm lever on which is mounted a first pedal, the first crank arm being connected to the rotatable member for pivoting about a first pivot axis; and the first crank arm lever being connected to the first crank arm for pivoting about a second pivot axis; and a second crank arm having one end connected to the other end of the drum and the other end connected to an associated second crank arm lever on which is mounted a second pedal, the second crank arm being connected to the rotatable member for pivoting about a third pivot axis; and the second crank arm lever being connected to the second crank arm for pivoting about a fourth pivot axis; wherein each crank arm is movable between first and second configurations; in the first configuration each crank arm extending radially outwardly away from the drum and each crank arm lever projecting longitudinally from its associated crank arm and supporting the associated pedal radially outwards of the drum; each pedal projecting generally perpendicularly from the pedal's associated crank arm lever; and in the second configuration each crank arm being folded and extending through the associated end of the hollow drum and each crank arm lever being folded so that each pedal extends generally parallel to the pedal's associated crank arm, so that the crank arm and its associated pedal are at least partially contained within the interior of the drum.

12. The folding bicycle of claim 11, wherein each crank arm is provided with a crank locking arm which is pivotally mounted to the drum at a position displaced from the pivotal mounting of the crank arm, and engages with a locking recess in the associated crank arm lever when in the operative condition.

13. The folding bicycle of claim 11, wherein the bearings are provided around the outer surface of the drum and mount the drum for rotation in a cylindrical bracket portion attached to the frame.

14. The folding bicycle of claim 11, wherein in the inoperative condition the crank arms and pedals are contained wholly within the drum.

15. The folding bicycle of claim 11, wherein the drum is connected to a chain wheel which drives a sprocket for the first wheel of the vehicle by means of the belt or chain.

16. The folding bicycle of claim 11, wherein each pedal is held securely in the inoperative position by way of a locking device.

17. A bicycle having a frame, a first wheel mounted on the rear of the frame, a second wheel mounted on the front of the frame, handlebars mounted on the frame and connected to steer the second wheel, and a saddle mounted on the frame, wherein a hollow rotatable drum is mounted on the frame by means of a bearing, for rotation with respect to the frame about a transverse axis of rotation, the hollow drum being drivingly coupled to the first wheel by means of a chain or belt, and the hollow drum having first and second open ends; a first crank arm assembly connected pivotally to the drum at a first point of connection adjacent the first open end of the drum and a second crank arm assembly connected pivotally to the drum at a second point of connection adjacent the second open end of the drum, the first point of connection and the second point of connection being on opposite sides of the drum; the first crank arm assembly comprising an elongate first crank arm extending from the first point of connection to a first pedal connected pivotally to the first crank arm, and the second crank arm assembly comprising an elongate second crank arm extending from the second point of connection to a second pedal connected pivotally to the second crank arm; wherein each of the first and second crank arm assemblies is changeable between an operative condition and an inoperative, folded condition;
wherein in the operative condition the first crank arm extends radially away from the drum in a first direction and the first pedal extends generally perpendicularly to the first crank arm; and the second crank arm extends radially away from the drum in a second direction opposite to the first direction and the second pedal extends generally perpendicularly to the second crank arm; and
in the inoperative condition the first crank arm is folded so as to project through the first open end of the drum and the first pedal is folded so as to extend generally parallel to the first crank arm; and the second crank arm is folded so as to project through the second open end of the drum and the second pedal is folded so as to extend generally parallel to the second crank arm.

18. The bicycle of claim 17, wherein the first crank arm is connected to the first pedal by a first crank arm lever which is pivotally mounted on the first crank arm, the first pedal projecting perpendicularly from the first crank lever; the second crank arm is connected to the second pedal by a second crank arm lever which is pivotally mounted on the second crank arm, the second pedal projecting perpendicularly from the second crank lever; in the operative condition the first crank arm lever extends longitudinally from the first crank arm, and the second crank arm lever extends longitudinally from the second crank arm; and in the inoperative condition the first crank arm lever is folded with respect to the first crank arm so that the first pedal extends parallel to the first crank arm, and the second crank arm lever is folded with respect to the second crank arm so that the second pedal extends parallel to the second crank arm.

19. The bicycle of claim 18, wherein each crank arm is provided with a crank locking arm which is pivotally mounted to the drum at a position displaced from the pivotal mounting of the crank arm, and engages with a locking recess in the associated crank arm lever when in the operative condition.

* * * * *